March 6, 1962  J. F. KINNEY  3,023,801
CONTROL APPARATUS FOR INTERNAL COMBUSTION ENGINE
Filed Sept. 14, 1956  3 Sheets-Sheet 1

INVENTOR.
JOHN F. KINNEY
BY
ATTORNEY

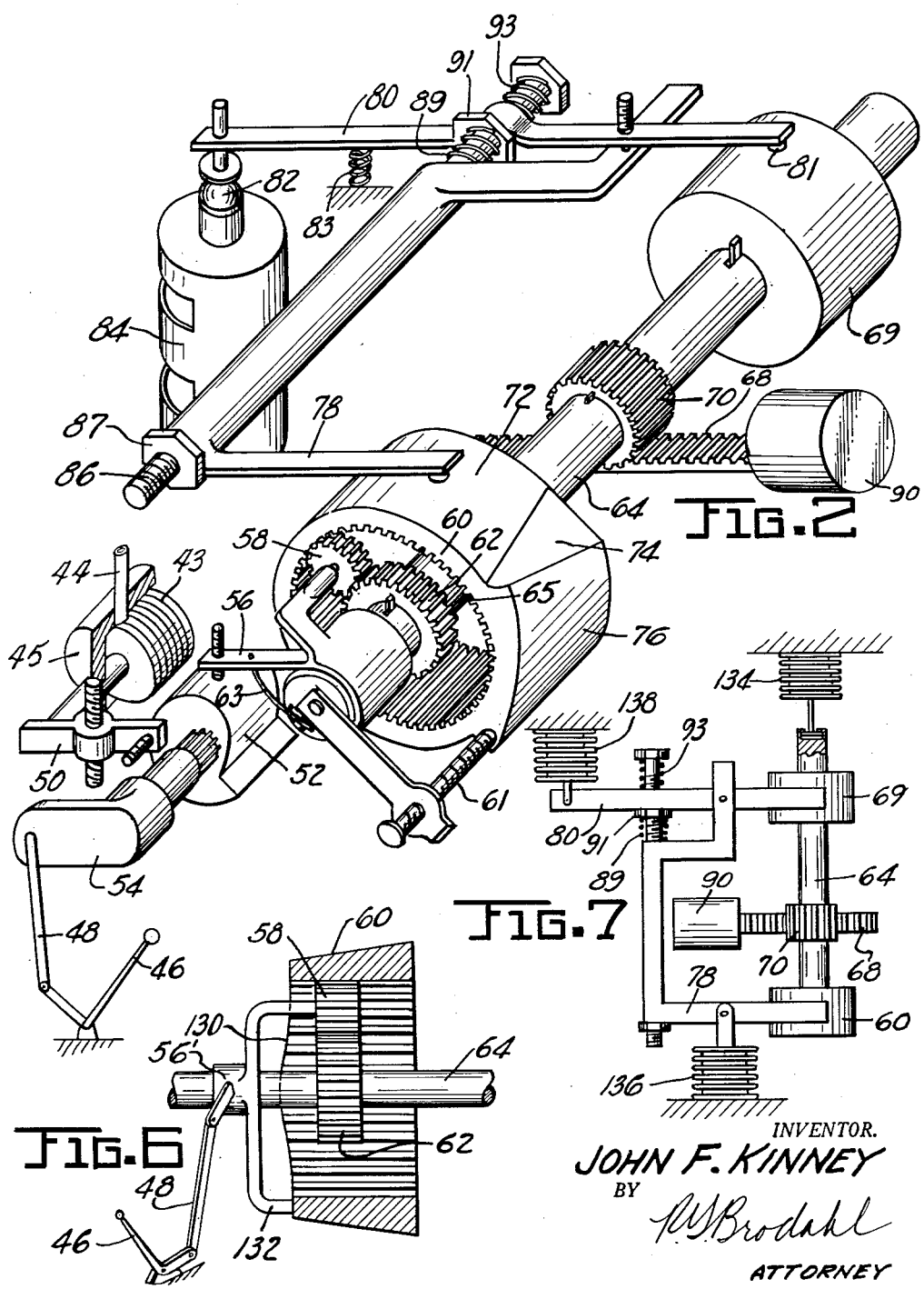

March 6, 1962 J. F. KINNEY 3,023,801
CONTROL APPARATUS FOR INTERNAL COMBUSTION ENGINE
Filed Sept. 14, 1956 3 Sheets-Sheet 3

INVENTOR.
JOHN F. KINNEY
BY
ATTORNEY

United States Patent Office 3,023,801
Patented Mar. 6, 1962

3,023,801
CONTROL APPARATUS FOR INTERNAL
COMBUSTION ENGINE
John F. Kinney, South Bend, Ind., assignor to The
Bendix Corporation, a corporation of Delaware
Filed Sept. 14, 1956, Ser. No. 610,020
4 Claims. (Cl. 158—36.3)

The present invention relates in general to control apparatus for an engine, and more particularly to fuel control apparatus for an internal combustion engine such as a gas turbine or spark ignition engine or the like.

It is an object of the present invention to provide an improved control apparatus for an internal combustion engine such as a gas turbine or spark ignition engine or the like.

It is an additional object of the present invention to provide an improved engine control apparatus and more specifically to provide an improved speed governing apparatus for an engine.

It is another object of the present invention to provide improved servo operated engine speed governing apparatus, which requires but a single speed responsive member for the desired control operation.

It is a different object of the present invention to provide an improved fuel control apparatus which is operative to schedule fuel flow to the engine for steady state and engine acceleration or deceleration operation from the output of a single speed responsive device.

It is a further object of the present invention to provide an improved fuel control apparatus which is operative to schedule fuel flow to the engine during steady state operation during acceleration and during deceleration operation through the use of a single speed sensitive servo device.

It is a still additional object of the present invention to provide an improved servo operated engine speed governing apparatus which requires but a single set of speed weights and thereby eliminates the necessity for a second set of speed weights as required by prior art apparatus, and hence a considerably lighter fuel control apparatus is provided.

These and other objects and advantages of the present invention will become apparent in view of the following description taken in conjunction with the drawings wherein:

FIGURE 5 is a curve chart illustrating the operation of the fuel control apparatus in accordance with the present invention;

FIGURE 6 illustrates a modified form of the present invention; and

FIGURE 7 illustrates a further modified form of the present invention.

Figure 1:
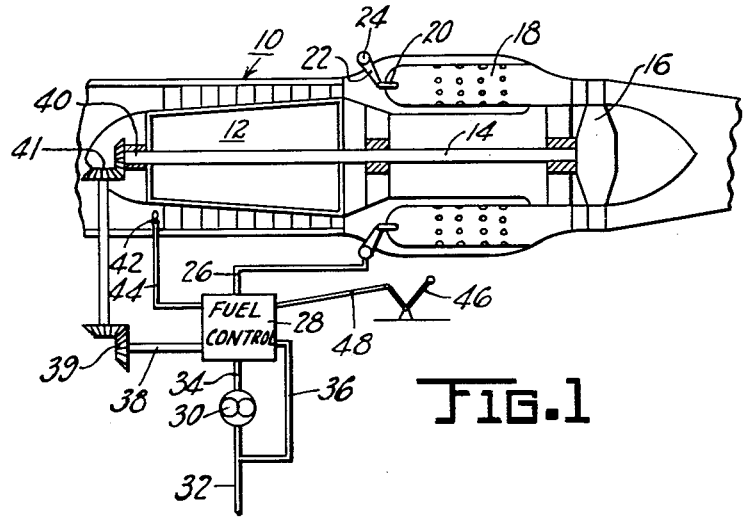
FIGURE 1 is a schematic illustration of the fuel control apparatus in accordance with the present invention.

In FIGURE 1 there is shown a gas turbine type of engine 10 including a compressor 12 connected through a drive shaft 14 to a turbine 16. A plurality of combustion chambers 18 are provided, each having a fuel nozzle 20 connected through individual fuel lines 22 to a common fuel manifold 24. Fuel is supplied to the latter fuel manifold 24 through a fuel conduit 26 from a fuel control device 28. A fuel pressurizing or supply pump 30 is connected between input fuel conduit 32 and an output fuel conduit 34 leading to the fuel control device 28. A by-pass conduit 36 is provided for the fuel control device 28 as well known to persons skilled in this art. The fuel control device 28 is responsive to the operating speed of the engine 10 through a control shaft 38 connected through suitable gearing 39 and 41 to a shaft 40 connected to the rotational parts of the gas turbine 10. An engine air condition sensing device 42 is connected through a connection or passage 44 to the main fuel control device 28 to supply an air condition sense to said main fuel device such as pressure or temperature. A manual or operator's control throttle member 46 is connected through the linkage 48 to the fuel control device 28.

Figure 2:
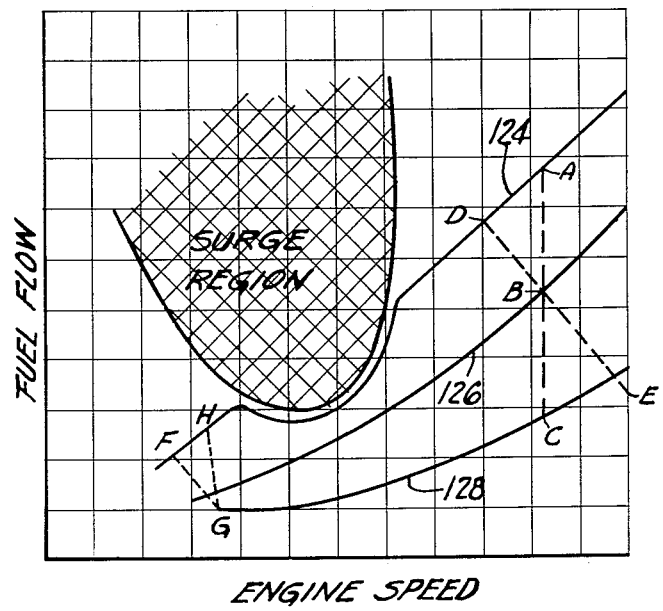
FIGURE 2 is a detailed perspective showing of the fuel control as illustrated in FIGURE 1.

Referring to the apparatus shown in FIGURE 2 an engine air condition responsive member 43 is shown connected through a control lever 50 to axially position a throttle and bias cam member 52. Air condition responsive member 43 is contained in a housing partially shown at 45 to receive the engine air condition sense from line 44. Also connected to the latter cam member 52 is a control arm 54 connected to the linkage arm 48 and the throttle member shown in FIGURE 1. A cam follower member 56 is connected to control the position of an idler gear 58 in a planetary control gear arrangement including a combined cam and ring gear member 60 and a sun gear member 62. The sun gear member 62 is connected for rotation with a control shaft 64. The cam follower member 56 is supported by the control shaft 64 but is free to rotate relative to the control shaft 64. An engine speed responsive control device 90 is connected through a rack 68 and a pinion 70 for radially positioning the control shaft 64 as a function of the operating speed of the gas turbine engine 10 of FIGURE 1. An acceleration control cam 69 is supported by and fastened to the control shaft 64 such that the acceleration cam 69 rotates with the control shaft 64. The combined cam and ring gear 60 comprises a ring gear having a plurality of control contoured cam surfaces on its exterior. A first of these surfaces, acceleration control surface 72, is operative with the acceleration cam 69 for controlling the fuel flow to the engine during the acceleration operation of the engine, such that the contour of cam 60 can be used to limit the fuel flow scheduled by cam 69. A second surface, steady state control surface 74, is operative for controlling the fuel flow to the engine during steady state operation of the engine. The contour of the latter cam surface 74 determines the governing slope or proportion of fuel flow change per r.p.m. change between the acceleration or deceleration operation of the engine and the steady state operating condition. A third control contour surface, minimum fuel flow or engine deceleration control surface 76, is operative for controlling the fuel supplied to the engine during engine deceleration or minimum fuel flow condition. A cam follower member 78 is operative through a control lever 80 for positioning a servo pilot valve or half-ball 82 for controlling the operation of the fuel metering control valve 84 and hence the fuel supply to the engine. Adjustment of the governing slope as well as the operation of the acceleration control slope 72 and the deceleration control slope 74 of the control cam 60, as may be desirable for adaptation to different engines or to modify the operating characteristics of any particular engine, may be accomplished by translation movement of the cam follower 78 along its support shaft 86 in an axial direction, by means of control member 87 acting against spring member 89. Similarly an acceleration schedule bias can be introduced to the operation of the acceleration cam 69 by translation movement of the control lever 80 by means of control member 91 acting with spring member 93 in an axial direction along the support shaft 86.

Figure 3:
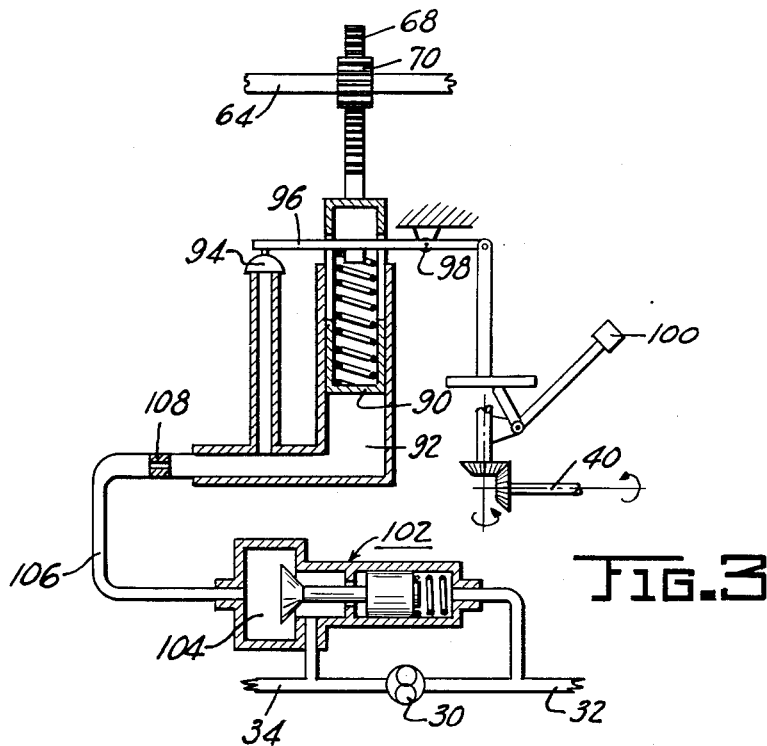
FIGURE 3 is a detailed schematic of the speed control device shown in FIGURE 2.

In FIGURE 3 a detailed showing of the speed control piston 90 of FIGURE 2 is made. In FIGURE 3 the rack 68 is shown operative with the pinion 70 connected to the control shaft 64. A speed responsive piston 90 is operative with a cylinder or fluid chamber 92 containing a servo control fluid, the pressure of which is controlled by a half-ball or a servo pilot valve 94 as a function of the position of a control lever 96 pivoted at connection 98 in response to the output of a speed responsive flyweight or like member 100 which is connected for rotation with the engine 10 of FIGURE 1. Servo control fluid is supplied by a servo pressure regulator valve 102 from the output of the fuel supply pump 30 corresponding to the fuel supply pump as shown in FIGURE 1. The operation of the servo pressure control or regulator valve 102 to provide a servo control fluid at pressure $P_r$ within the fluid chamber 104 is believed to be well known. The conduit 106 supplies servo control fluid through the control orifice 108 to the fluid chamber 92 for controlling the speed piston 90 in response to changes of position of the half-ball member 94 as a function of engine speed through the control lever 96 and the speed weight 100.

Figure 4:
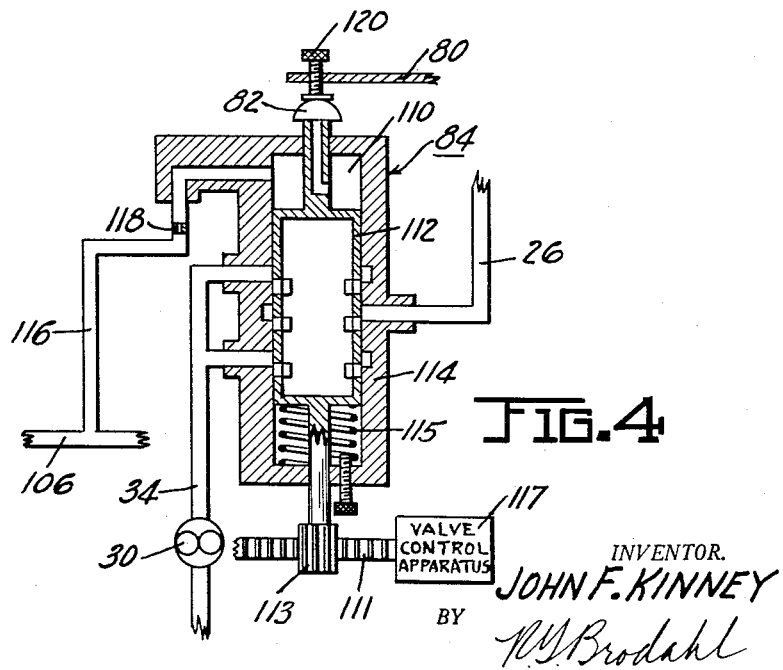
FIGURE 4 is a schematic showing of the metering valve shown in FIGURE 2.

In FIGURE 4 a detailed showing is made of the metering valve 84 shown in FIGURE 2. The control lever 80 is operative to position the servo pilot valve or half-ball 82 in accordance with the teachings of FIGURE 2. The servo half-ball 82 controls the fluid pressure within the fluid chamber 110 and thereby the position of the metering valve member 112 relative to the surrounding sleeve member 114 and against the compression force of the control spring member 115. Fuel at pump output pressure $P_1$ is supplied from the fuel pump 30 through the conduit 34 and through the control ports between the valve member 112 and the sleeve member 114 and out through the conduit 26 to the fuel manifold 24 and the fuel nozzles as shown in FIGURE 1. Servo control fluid at servo pressure $P_r$ is supplied from the fluid conduit 106, as described relative to the apparatus of FIGURE 3, through the fluid conduit 116 and the control orifice 118 to the fluid chamber 110 such that the position of the half-ball member 82 as determined by the control lever 80, and the manually adjustable control member 120 connected to the control lever 80, thereby determines the fluid pressure within the fluid chamber 110 and hence the axial position of the metering valve member 112 to thereby control the fuel flow to the conduit 26 and to the engine 10. The rotary position of the metering valve member 112 may be controlled as a function of compressor discharge pressure or some other suitable engine operating parameter through the rack 111 and pinion 113 and the valve control apparatus 117, if desired.

In FIGURE 5 there is shown a curve chart illustrating the fuel flow to the engine as a function of engine speed. The uppermost curve 124 represents the acceleration fuel flow operation of the engine. The intermediate curve 126 corresponds to the steady state operation of the engine, and the curve 128 corresponds to the deceleration operation of the engine.

The engine control apparatus in accordance with the present invention is operative by the acceleration control surface 72 of the outer control gear 60 acting through the cam follower 78 and the control lever 80 in conjunction with the acceleration cam 69 for controlling the fuel flow to the engine as a function of engine speed in accordance with the acceleration curve 124. In this respect the acceleration control surface 72 causes the cam follower member 81 of the control lever 80 to ride on the acceleration fuel flow control cam 69 during acceleration operation of the engine 10. The steady state contour surface 74 of the combined cam gear member 60 is operative to control the governor operation between the acceleration curve 124 and the deceleration curve 128 relative to the steady state curve 126. In this respect the contour surface 74 determines the governing slope between the curves 124 and 128 shown in FIGURE 5, which slope may be varied from a substantially isochronous condition where the governor curve is substantially vertical as shown by line A—C, to a lesser slope as shown by line D—E as may be desired by axially moving the combined cam and gear member 60 by means of the control member 61 shown in FIGURE 1, or by translating the cam follower 78 along the support shaft 86 in an axial direction relative to the support shaft 86 by means of the control nut member 87. The contour surface 76 of the combined cam and gear member 60 is operative to determine the minimum fuel flow to the engine 10 in accordance with the deceleration curve 128.

In FIGURE 6 there is shown a top view of a modified form of the combined cam and gear member 60 of FIGURE 2. The modification consists of a control contour or cam surface 130 provided along the edge or side of the control gear member 60, to thereby vary the axial dimensions of the control gear member for the purpose of providing an axial translation movement of the combined cam and gear member 60 as a function of throttle movement and the engine air condition bias previously introduced by the throttle and bias cam member 52. In the apparatus as shown in FIGURE 6 the latter cam member 52 is not included, and the control throttle member 46 is connected directly to the control member 56' as shown, with the latter member 56' including an arm 132 operative with the cam surface 130 to axially translate the control gear member 60 along support shaft 64.

In this respect and with reference to the curves of FIGURE 5, the slope of the idle steady state curve F—G normally has a slope approximately the same as the military governing slope curve D—E, however it may be desirable to steepen the idle steady state curve F—G by appropriate contouring of the side or edge surface of the combined cam and gear member 60 as shown in FIGURE 6. In this manner an idle steady state curve such as G—H may be effected.

In FIGURE 7 there is shown another embodiment of the control apparatus in accordance with the present invention. This embodiment incorporates engine air condition responsive members 134, 136 and 138, similar to member 43 of FIGURE 2 except the housing is removed, to position shaft 64, lever 78 and lever 80 respectively. This arrangement enables metering valve 84 to be responsive to the additional engine air parameter during acceleration, steady state and deceleration operating ranges.

The fuel control apparatus in accordance with the present invention is operative to schedule fuel flow to the engine 10 for engine acceleration, steady state and deceleration operation through the use of a single servo powered speed responsive control device 66. The speed control device 66 is responsive to the operating speed of the engine 10 and through the rack 68 and the spur or pinion gear 70 rotatably positions the control shaft 64 as a function of engine speed. The rotational movement of the control shaft 64 is imparted through the inner control gear 62 to position the combined cam and gear 60 as a function of engine speed through the idler gear or intermediate control gear 58. It is to be understood that the ring cam gear 60 is rotatably supported on the control shaft 64, for rotational movement relative to the control shaft 64, by a suitable bearing member 65. The intermediate or idler gear 58 is supported and positioned by the cam follower member 56, as a function of the scheduled position of the throttle member 46 which rotates the throttle and bias cam member 52 and also as a function of engine air conditions such as the inlet temperature to the engine or the inlet pressure to the engine, as may be desired for any particular control function, or it may be the compressor discharge pressure or temperature or some intermediate pressure or temperature as determined by the location of engine air condition sensing device 42 shown in FIGURE 1. The output of the engine air condition responsive member 43 is applied through the control lever 50 to axially position the throttle and bias cam member 52.

It may be desirable to spring load the gear system including the control gears 58, 60 and 62 to eliminate backlash and insure contact between the cam follower 56 and the throttle and bias cam member 52. This spring loading may be practically accomplished by the provision of a torsion spring member 63 connected between the control shaft 64 and the cam follower member 56 if desired. It should be understood that the engine air condition bias for the fuel control governor member is obtained through the axial translation of the throttle and bias cam member 52 whereas the governing by the throttle member 46 is achieved by radially contouring the throttle and bias cam member 52. Adjustment of the governing slope, with reference to FIGURE 5, that is adjustment of the slope of the line D—E as compared to the line A—C may be accomplished by axial translation of the combined cam and gear member 60 relative to the support shaft 64 by means of the control member 61. On the other hand, if governing slope adjustment is deemed unnecessary governor bias can be contoured directly on the axial dimension of the combined cam and gear member 60 as shown in FIGURE 6. In the latter instance the pilot's control throttle member 46 may be constructed integrally with the cam follower member 56' thus eliminating the throttle and bias cam member 52.

Some of the novel features of my apparatus may be best disclosed by a consideration of the operation of the FIGURE 2 apparatus in accordance with the curves illustrated in FIGURE 5. Assume for example that the engine is operating at steady state idle conditions. The fuel flow supplied to the engine would be that represented by the ordinate of the intersection of steady state curve 126 and idle governing curve F—G of FIGURE 5. Metering valve 84 under these conditions would be controlled by cam follower 78 which would be contacting the approximate radial midpoint of cam surface 74 of the combined cam and ring gear 60. If it is now desired to increase engine speed to that represented by the abscissa of point B, throttle 46 is advanced in a clockwise direction which also results in positioning bias cam 52, idler gear 58, and the combined cam-gear 60 clockwise, thus placing surface 72 of cam-gear 60 underneath follower 78 approximately as illustrated in FIGURE 2. This movement of follower 78 clockwise allows follower 81 to come into contact with acceleration cam 69 and to control metering valve 84 in accordance with the contour of cam 69. The clockwise movements of followers 78 and 81 results in upwards or opening movement of metering valve 84 such that the fuel supplied to the engine is in excess of its steady state requirements and thus will cause the engine to accelerate. As the engine accelerates and increases in speed, fuel flow will be affected in the following manner: first, valve control apparatus 117, FIGURE 4, will progressively rotate and open metering valve 84 in response to an engine parameter such as compressor pressure causing a generally linear fuel flow change with speed that assists in maintaining acceleration; and second, speed control piston 90 moves to the left as viewed in FIGURE 2, rotating cam 69 clockwise and cam-gear 60 counterclockwise thus allowing metering valve 84 to move further open in an axial or upwards direction as guided by the contour of cam 69. These combined effects tending to increase fuel cause the engine to continue to accelerate as represented by the curve 124 of FIGURE 5. However, as the acceleration proceeds towards point D on curve 124, follower 78 closely approaches the rapid cam rise of surface 74 of the cam-gear 60. When follower 78 contacts surface 74 it will move counterclockwise and simultaneously lift follower 81 from cam 69 and move metering valve 84 downwardly in a flow decreasing direction as represented by the downward slope of line D—E in FIGURE 5. Acceleration will proceed until the point B on line D—E is reached at which point the steady state conditions are again achieved and follower 78 will again be at the approximate midpoint of surface 74.

It should be noted that steady state curve 126 is representative of fuel flow required to maintain various stable engine speeds at selected operating conditions. However, when certain operating conditions change such for example any variation that would alter the engine load, the steady state curve will be different and may be displaced upwardly or downwardly from that illustrated by curve 126. A steady state curve at high altitude is generally lower than one at a lower altitude. If the engine were propelling an aircraft in a slight climb the steady state curve would be greater than if the aircraft were imperceptibly falling in altitude. Thus steady state curve 126 is in actual practice a family of curves shifting within the limits defined by curves 124 and 128. However, regardless of the variable nature of the curve, fuel flow within the governing range will be automatically adjusted to seek a stable speed. If for example due to sudden changes in operating conditions steady state curve 126 shifted downwardly, point B would be above the steady state curve representing a condition of excess fuel for stable operation. Thus engine speed would increase rotating cam-gear 60 and further decreasing fuel until the new stable point is reached. Thus the line D—E represents a range of possible stable points of operation depending on what the instantaneous value of curve 126 may be.

Deceleration is substantially the reverse of the acceleration and is initiated by repositioning throttle 46 in a counterclockwise direction which moves the combined cam-gear 60 in a like direction so that follower 78 contacts surface 76. This positions metering valve 84 in a further closed position thus reducing the fuel supplied to the engine below that required for stable operation. As the engine decelerates cam-gear 60 moves clockwise so that follower 78 traverses the contour of surface 76 causing fuel to decrease in accordance with curve 128. When surface 74 is reached follower 78 will again move clockwise, increasing fuel until a stable point of operation is again attained.

Appropriate gear ratios should be chosen with respect to the range of the pilot's control throttle member 46 angle of position adjustment and also relative to the range of rotation of the support shaft 64. A much larger range of gear ratios becomes available if a step spur type of gear is used in place of a single diameter idler or intermediate control gear 58.

An advantage of the present control apparatus is that the entire system is lightly loaded, with the only load applied being that of the torsion spring member 63 connected between the support shaft 64 and the cam follower member 56, the loading spring 83 for the cam follower 78 and the control lever 80 as necessary to maintain contact with respectively the combined cam and gear member 60 and the acceleration cam 69, and any hydraulic unbalance of the half-ball 82 which controls the metering valve 84. It should be further understood that control members 87 and 91 are shown as threaded with support shaft 86, and that additional engine control parameters may be introduced through rotation of the control members 87 and 91 by suitable control parameter responsive devices, if desired.

Although the present invention has been described with a certain degree of particularity it should be understood that the present disclosure has been made only by way of example and that numerous changes in the details of construction and the combination and arrangement of parts may be resorted to without departing from the scope and spirit of the present invention.

I claim:

1. In a control apparatus for an engine the combination of a fuel conduit for supplying fuel to the engine, a fuel valve operative with said conduit as a fuel flow control valve, first lever means operatively connected to said fuel valve to control the position of said fuel valve as a function of the position of said first lever means, engine speed responsive means responsive to engine operating speed, shaft means operatively connected to said engine speed responsive means to assume a rotative position functionally related to engine operating speed, a throttle member, a planetary control member arrangement having a first control gear member operatively connected to said shaft means, a second control gear member operatively connected to said throttle member, and a third control gear member having a cam surface formed on the outer surface thereof, said third gear member operatively connected to and positioned by said first and said second control gear members, said cam surface being connected to said lever means to position said fuel valve as a function of said engine speed responsive means and said throttle member.

2. In a control apparatus for an engine, a combination of a fuel conduit for supplying fuel to the engine, a fuel valve operative with said conduit as a fuel flow control valve, first lever means operatively connected to said fuel valve to control the position of said fuel valve as a function of the position of said first lever means, engine speed responsive means responsive to engine operating speed, shaft means operatively connected to said engine speed responsive means to assume a rotative position functionally related to engine operating speed, air condition responsive means responsive to engine operating air condition, a planetary control member arrangement having a first control gear member operatively connected to said shaft means, a second gear control member operatively connected to said air condition responsive means, and a third control gear member containing a cam surface thereon, said third control gear member operatively connected to and positioned by said first and said second control gear member, said cam surface connected to said lever means to position said fuel valve as a function of said engine speed responsive means and said air condition responsive means.

3. In a control apparatus for an engine the combination of a fuel conduit for supplying fuel to the engine, a fuel valve operative with said conduit as a fuel flow control valve, first lever means operatively connected to said fuel control valve to control the position of said fuel control valve as a function of the position of said first lever means, speed responsive means responsive to engine operating speed, first shaft means operatively connected to said engine speed responsive means to assume a rotative position functionally related to said engine speed, a throttle member, second shaft means connected to and positioned rotationally by said throttle member, a first cam member slidably mounted on said second shaft means and positioned rotationally by said second shaft means, air condition responsive means connected to said first cam member to position said first cam member axially as a function of engine operating air condition, second lever means operatively connected to said first cam member positioned as a function of the contour on said first cam member, a planetary control member arrangement having a first control gear member operatively connected to said first shaft means and positioned rotationally as a function of the position of said first shaft means, a second control gear member operatively connected to and positioned by said second lever means, a third control gear member having an outer contoured surface, said contoured surface operatively connected to said first lever means to position said first lever means.

4. In a fuel control apparatus for an engine the combination of a fuel conduit for supplying fuel to the engine, variable restriction means in said conduit to control the flow of fuel through said conduit, lever means operably connected to said variable restriction means to position said variable restriction means as a function of the position of said lever means, speed responsive means responsive to actual engine operating speed, an acceleration cam member connected to said speed responsive means and positioned rotationally as a function of said actual engine speed, said acceleration cam member further connected to said lever means to position said lever means as a function of the contour on said acceleration cam member during the acceleration range of said engine, steady state cam member connected to said engine speed responsive means and positioned rotationally as a function of said actual engine speed, said steady state cam member further connected to said lever means to position said lever means during the steady state operational range of said engine, said steady state cam member having a contoured surface for positioning said lever means in a direction to decrease fuel flow with an increase in engine speed to provide an engine speed governing range of operation.

References Cited in the file of this patent

UNITED STATES PATENTS

| | | |
|---|---|---|
| 1,959,786 | Hodgkinson | May 22, 1934 |
| 2,326,238 | Mabey | Aug. 10, 1943 |
| 2,372,989 | Udale | Apr. 3, 1945 |
| 2,489,586 | Ray | Nov. 29, 1949 |
| 2,515,074 | Bobier | July 11, 1950 |
| 2,699,524 | Jackson et al. | Jan. 11, 1955 |
| 2,720,751 | Kunz | Oct. 18, 1955 |
| 2,750,734 | Anxionnaz et al. | June 10, 1956 |
| 2,779,422 | Dolza et al. | Jan. 29, 1957 |
| 2,867,084 | Criswell | Jan. 6, 1959 |

FOREIGN PATENTS

| | | |
|---|---|---|
| 508,139 | Canada | Dec. 14, 1954 |

UNITED STATES PATENT OFFICE
CERTIFICATE OF CORRECTION

Patent No. 3,023,801                          March 6, 1962

John F. Kinney

It is hereby certified that error appears in the above numbered patent requiring correction and that the said Letters Patent should read as corrected below.

Column 7, line 11, after "third" insert -- control --.

Signed and sealed this 24th day of July 1962.

(SEAL)
Attest:

ERNEST W. SWIDER
Attesting Officer

DAVID L. LADD
Commissioner of Patents